United States Patent [19]

Spencer

[11] Patent Number: 4,963,168
[45] Date of Patent: Oct. 16, 1990

[54] APPARATUS FOR RECOVERING SOLVENT FROM SOLVENT LADEN PROCESS AIR STREAMS

[75] Inventor: Robert J. Spencer, Naperville, Ill.

[73] Assignee: Allied-Signal Inc., Morris Township, N.J.

[21] Appl. No.: 382,948

[22] Filed: Jul. 21, 1989

[51] Int. Cl.$^5$ .................... B01D 53/04; B01D 19/00
[52] U.S. Cl. ........................... 55/180; 55/185; 55/190; 55/204; 55/208; 55/387
[58] Field of Search ............... 55/59, 61, 179, 180, 55/183–185, 190, 203, 204, 208, 387

[56] References Cited

U.S. PATENT DOCUMENTS

| | | | |
|---|---|---|---|
| 1,453,215 | 4/1923 | Voress et al. | 55/59 |
| 1,616,242 | 2/1927 | Voress et al. | 55/59 |
| 2,428,885 | 10/1947 | Luáces | 55/59 |
| 2,642,949 | 6/1953 | Tyskewicz | 55/203 X |
| 2,777,533 | 1/1957 | Segrest | 55/204 X |
| 2,786,546 | 3/1957 | McMillin | 55/203 |
| 2,818,133 | 12/1957 | Rosenthal | 55/59 |
| 2,893,510 | 7/1959 | Spann | 55/204 |
| 4,282,015 | 8/1981 | Bartoschek et al. | 55/208 X |
| 4,289,505 | 9/1981 | Hardison et al. | 55/59 |
| 4,414,003 | 11/1983 | Blaudszun | 55/59 X |
| 4,436,534 | 3/1984 | Seguy | 55/59 X |
| 4,487,614 | 12/1984 | Yon | 55/59 X |
| 4,539,023 | 9/1985 | Boley | 55/204 X |
| 4,589,890 | 5/1986 | Gronvaldt | 55/59 |
| 4,689,054 | 8/1987 | Vara et al. | 55/61 |
| 4,746,335 | 5/1988 | Reimann et al. | 55/185 X |
| 4,853,014 | 8/1989 | Bloch | 55/185 |
| 4,859,216 | 8/1989 | Fritsch | 55/180 X |

FOREIGN PATENT DOCUMENTS

| | | | |
|---|---|---|---|
| 2703737 | 8/1978 | Fed. Rep. of Germany | 55/59 |
| 2721063 | 11/1978 | Fed. Rep. of Germany | 55/204 |
| 54-007677 | 1/1979 | Japan | 55/190 |

*Primary Examiner*—Robert Spitzer
*Attorney, Agent, or Firm*—Jay P. Friedenson

[57] ABSTRACT

Apparatus for removing solvent vapor from a process air stream including at least first and second tanks each containing a carbon bed and alternately connected to a solvent laden air inlet duct and an outlet duct for respectively directing the solvent laden process air into desorbing contact with the carbon bed while providing an exit flow path for the treated process air stream to be discharged from the tank. When the carbon bed is saturated with adsorbed solvent, the inlet and outlet ducts close and are switched to supply solvent laden process air to the other tank to achieve continuous processing of the air stream. The saturated tank is provided with steam which flows through the carbon to desorb solvent. The desorbed solvent laden steam enters a condenser where the steam and solvent vapor are condensed and drained to a separator through a bottom outlet in the condenser. A second outlet from the condenser directs solvent vapor and air which does not condense into a swirl chamber of a degasser where the air/vapor separate from the entrained condensate. The condensate drains from the chamber through a bottom outlet. The solvent vapor/air exits the chamber through an upper air inlet to rejoin the solvent laden process air in the inlet duct.

15 Claims, 3 Drawing Sheets

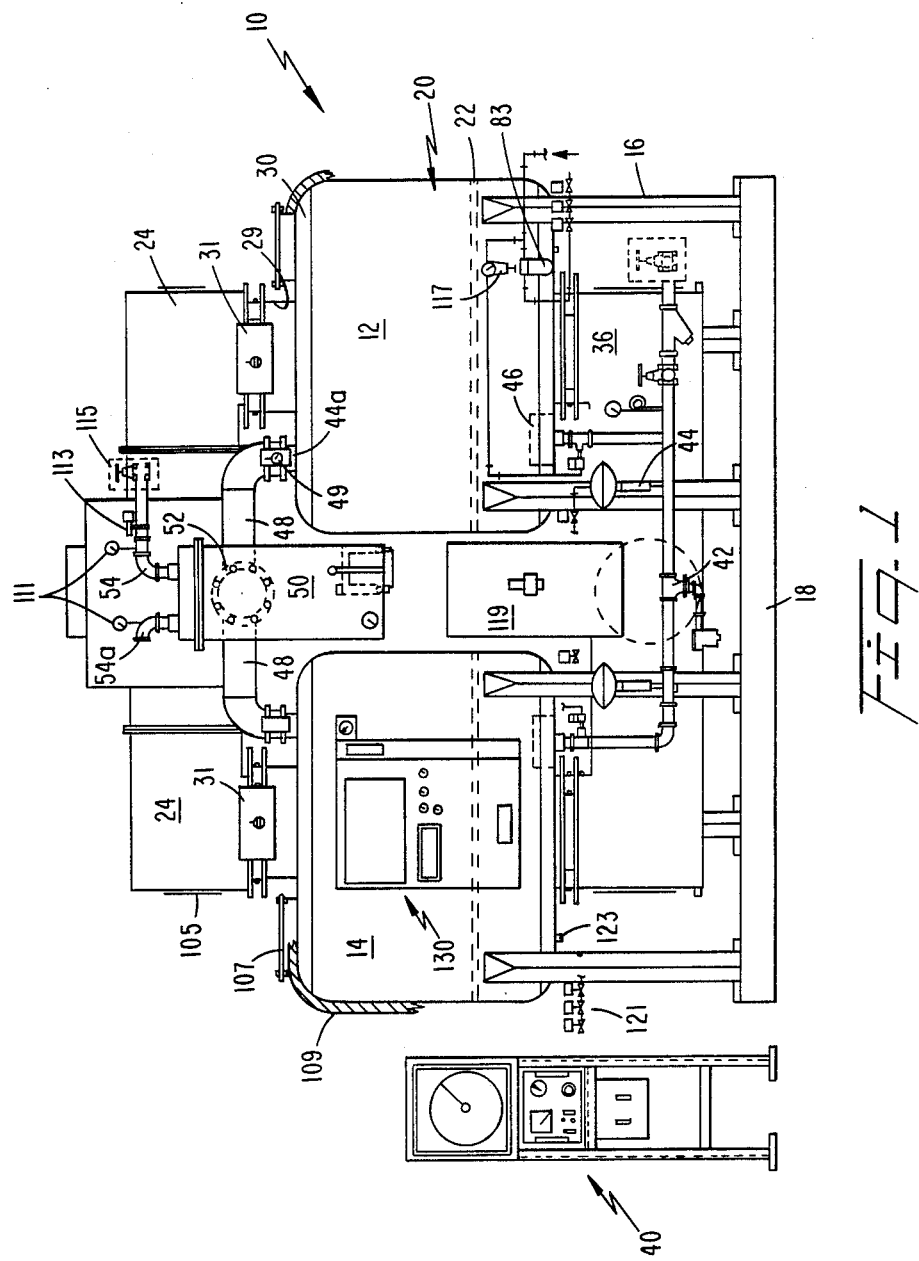

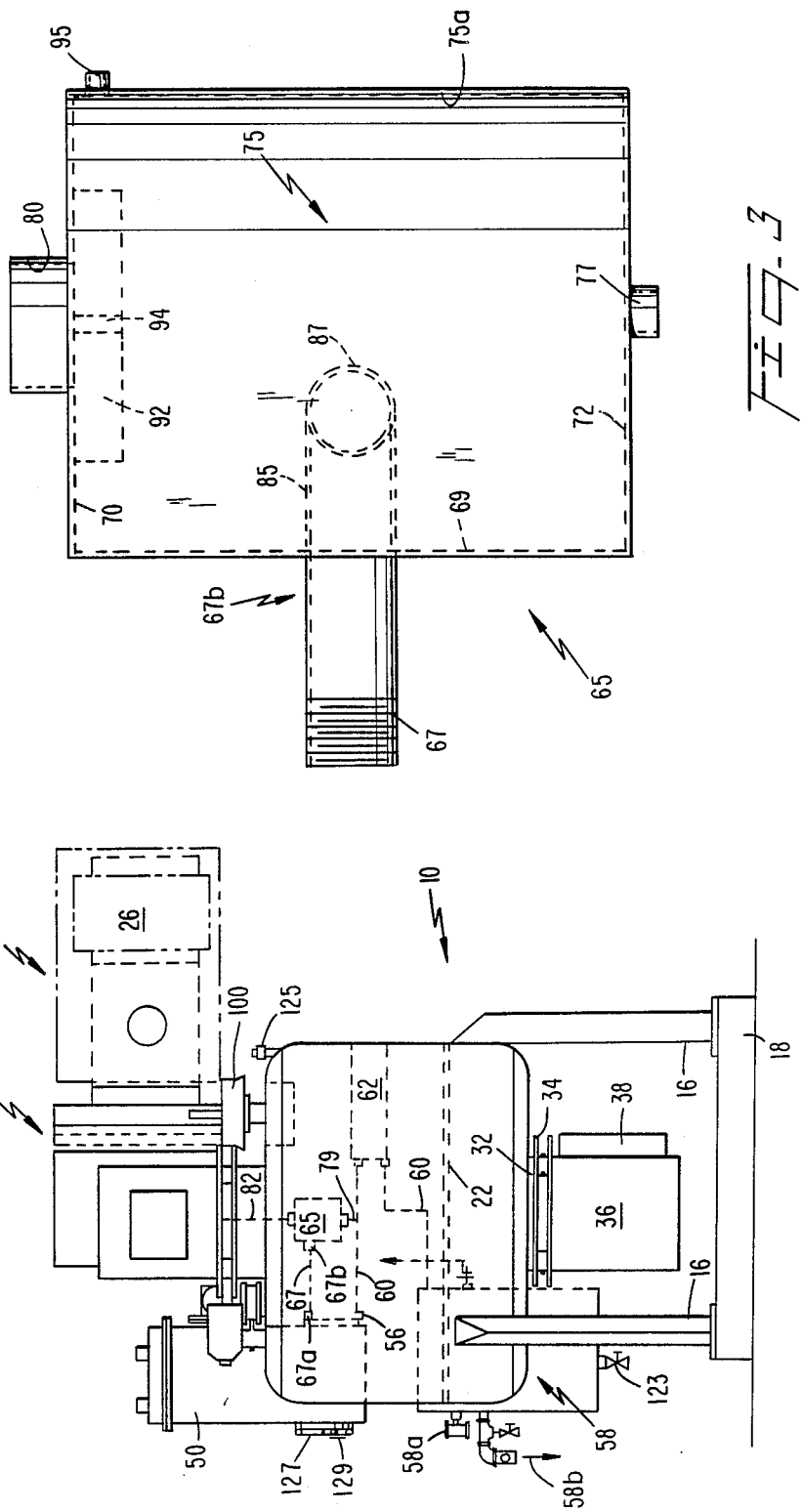

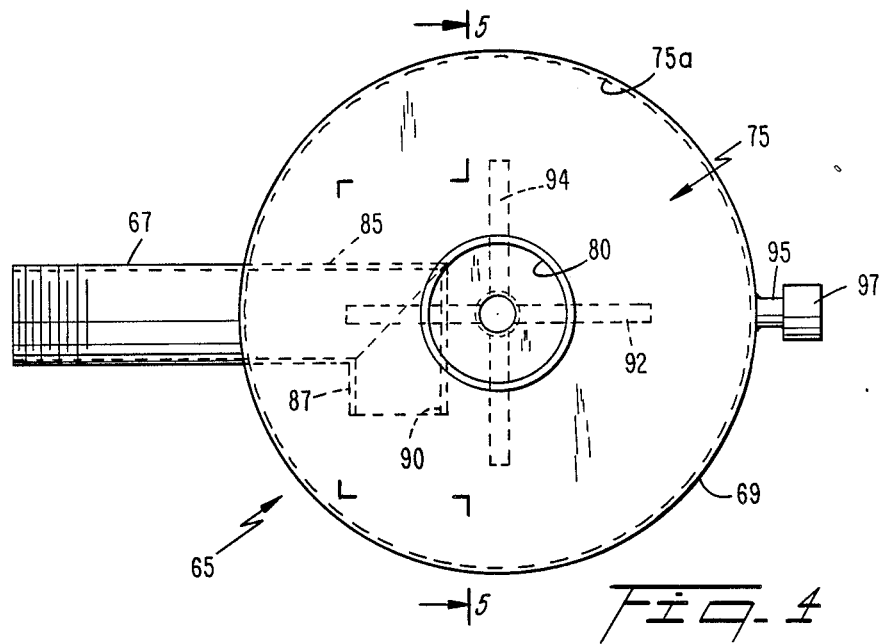
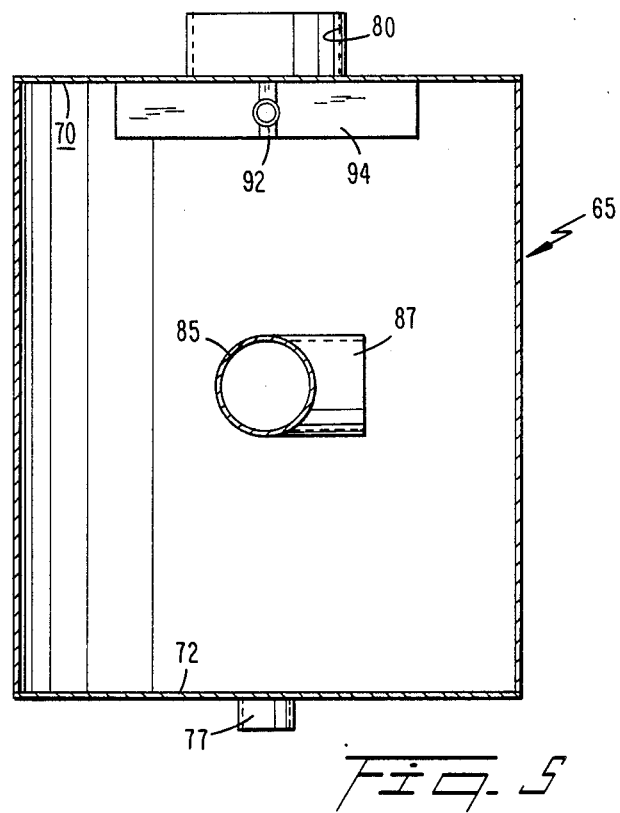

APPARATUS FOR RECOVERING SOLVENT FROM SOLVENT LADEN PROCESS AIR STREAMS

TECHNICAL FIELD

The present invention generally relates to apparatus for recovering solvent vapor in solvent laden process air streams from, for example, degreasers and other types of equipment utilizing chlorinated and fluorinated solvents. More particularly, the present invention relates to regeneration of carbon adsorption systems by desorption of the solvent from the carbon in steaming and compressed air purging cycles under controlled flow conditions.

BACKGROUND ART

Apparatus utilizing activated carbon to adsorb solvent vapors from a flowing process air stream (from a degreaser or other plant exhaust air stream) is known. In one type of known apparatus, two tanks are provided, each tank containing a bed of activated carbon supported on a grate within the tank bottom. Solvent laden process air, ducted from the degreaser equipment through an inlet duct, is directed into one of the tanks through an inlet opening formed in a top wall thereof. Each inlet opening is selectively opened and closed to alternately connect the tanks to the inlet duct through pneumatically actuated inlet valves.

In the adsorption mode, the solvent laden air stream enters one of the adsorbing tanks through the inlet opening where the stream is forced to flow downwardly through the carbon bed which is effective to remove, by adsorption, more than 97% of the solvent vapor entering the adsorbing tank. The treated air stream then flows downwardly through the grate into the tank bottom where it exits the tank through an outlet. The outlet is connected through a pneumatically actuated valve to an outlet duct which then directs the treated air stream out of the apparatus. A main blower within the outlet duct downstream from the tank outlet induces the air flow which pulls the solvent laden air stream through the carbon bed.

In the adsorption mode of one of the tanks, the associated solvent laden air inlet and outlet valves are open while the corresponding valves of the other tank are closed. When the carbon in the bed becomes loaded to a predetermined level in the adsorbing tank, as may be detected with a hydrocarbon analyzer (e.g., a Flame Ionization Detector Monitor), the inlet and outlet valves of the adsorbing tank are closed and the corresponding valves of the other tank are opened in the adsorbing mode to switch tanks. The tank previously in the adsorbing mode now undergoes regeneration.

In the regeneration mode, steam is supplied into the bottom of the regenerating tank through a valved steam inlet pipe. As the steam flows upwardly under pressure (e.g., 9-10 psig) through the carbon bed, solvent is desorbed from the carbon by the steam. The steam then functions as a carrier gas to transport the solvent vapor through a steam exhaust pipe into a main condenser. The steam enters an exhaust manifold through a steam outlet in the top of the tank which may be opened and closed with a steam exhaust valve.

In the condenser, the steam and entrained solvent vapor are condensed by means of cooling water circulating within the condenser in a separate water cooling jacket. The cooling water enters the jacket through a cooling water inlet pipe and leaves the jacket through a cooling water outlet pipe. The water and solvent condensates collect in the condenser bottom where they drain through a bottom outlet into a conventional water separator or decanter through piping. Optionally, a secondary condenser may be disposed within the piping to condense any solvent vapors entering the piping with the condensates. In the decanter, the water (i.e., condensed steam) and solvent condensates form separate immiscible liquid layers which may be separately drained off through a water outlet and solvent outlet in a known manner.

A second condenser outlet is connected to the water separator with other piping extending between the condenser and water separator. A vent pipe open to atmosphere extends vertically from a T connector in this other piping. The vent pipe has an upper end which terminates below an opening formed in the inlet duct in vertically spaced relationship to the opening. During the steaming cycle, any solvent vapor and steam which does not condense within the condenser enters the vent pipe through the second condenser outlet and condensate entrained through the second outlet with the vapor/air flows to the separator through the other piping. Theoretically, the solvent vapor and air flow upwardly out of the vent pipe to enter the solvent laden air inlet duct through the opening. In practice, however, since the upper end of the vent pipe is not connected to the inlet duct and has a larger diameter than the opening, solvent vapor and condensate as well as water condensate leaking into the vent pipe would often be propelled through the vent pipe in an uncontrolled manner at high velocity to strike the underside of the solvent laden air inlet duct and splash against the equipment surfaces, causing corrosion, equipment damage, and pollution of the working environment with solvent vapor. Consequently, very high room concentrations of solvent vapor have been experienced around the carbon adsorbing equipment as a result of leakage through the vent pipe.

After steaming, the steam inlet valve of the tank in the regenerating mode closes, the steam exhaust valve remains open and a compressed air valve opens to direct compressed air into the bottom of the tank beneath the carbon bed. The compressed air purges the steam and solvent vapor remaining in the tank at the end of the steaming cycle to recover solvent which would otherwise be lost to atmosphere. The compressed air enters the tank at a pressure of approximately 80 psig to drive the residual steam and solvent vapor from the tank to the condenser through the steam exhaust valve where most of the steam and solvent vapor condenses and is directed by the piping to the water separator. However, particularly under these higher air purging pressures causing splashing and turbulence within the condenser, large amounts of steam and solvent vapor as well as the purging air and condensates entrained with it would enter the vent pipe and also be propelled at a high velocity out of the pipe to strike the underside of the main inlet air duct. This condensate would then splash and run downward in a random and uncontrolled manner over the carbon adsorber equipment and onto the plant floor causing corrosion and equipment damage and very high room air concentrations of solvent vapor around the adsorber equipment as aforesaid.

DISCLOSURE OF THE INVENTION

It is according one object of the present invention to provide apparatus for removing solvent vapor from a process air stream with apparatus having a degasser connectable to the condenser which receives air/solvent vapor and condensates entrained with it from the condenser and separates the condensates from the air/vapor for recycling of the solvent vapor through an adsorbing mode in a closed loop system preventing venting of solvent vapor and/or condensate into the working environment.

Another object of the invention is to provide a degasser that relieves the condenser of overpressure occurring during the steaming and compressed air purging cycles during regeneration of adsorbing material in one of the processing tanks and which provides separate air and liquid flow paths for solvent vapor/air and condensates entering the degasser from the condenser as a result of overpressure.

A still further object of the invention is to prevent condensates and/or solvent vapor from being propelled into the working environment during solvent vapor recovery from process air streams.

Apparatus for removing solvent vapor from a process air stream, in accordance with the present invention, comprises at least a first tank provided with a bed of material capable of adsorbing solvent from the process air stream flowing through it in an adsorbing mode. An inlet duct directs the process air stream into the tank at one side of the bed and an outlet duct communicating with the other side of the bed directs treated process air flowing through the bed out of the tank. To terminate the adsorbing mode upon saturation of the bed or accumulation of adsorbed solvent therein at a predetermined level, the inlet and outlet ducts are closed to stop the flow of process air into and out of the tank. A gaseous flow medium is then directed into the tank through the bed. The gaseous flow medium has the characteristic of desorbing solvent from the bed in a regenerating mode. A condenser receives the gaseous flow medium and solvent vapor desorbed by the medium to condense the solvent vapor and/or medium into solvent and water condensates, respectively. The condensates are drained into a separator connected to the condenser through an outlet formed in the condenser bottom. A degasser connected to the condenser through at least one outlet located above the condenser bottom outlet receives residual solvent vapor and water and condensate entrained therewith from the condenser. The degasser is formed with a chamber of greater cross-sectional area than the flow path connecting it to the condenser. In the chamber, the solvent vapor and air are separated from the entrained condensates. The chamber includes an air outlet in an upper portion thereof through which the air and vapor exit the chamber, and a liquid outlet in a bottom portion thereof through which separated liquid is discharged from the chamber.

The air outlet of the chamber is preferably connected to the inlet duct to return solvent vapor and air to the at least one tank for further adsorption. The liquid outlet is connected to the separator to drain condensates from the chamber. The connections to the inlet duct and separator, in combination with the chamber, establish separate liquid and air closed loop systems which are capable of controlling overpressures within the condenser and separator by providing a chamber for depressurizing solvent air/vapor entering the condenser, and for prevention of venting of solvent vapor/condensates into the working environment causing pollution control problems and equipment damage.

Preferably, the degassing chamber includes a cylindrical side wall defining a cylindrical swirl chamber against which the solvent vapor/air/condensate entering the chamber from the flow path through an inlet are propelled so that the condensate may swirl within the chamber and collect, by gravity, at the bottom of the chamber in separated condition from the air and vapor. To control the direction of liquid flow swirling within the chamber and ensure rapid separation of liquid and air/vapor, the condensate inlet preferably has a first flow path portion extending radially inwardly from the cylindrical side wall into the chamber. A second flow path portion or outlet end, formed generally perpendicular and connected to the first portion, has a longitudinal flow axis forming an angle with a tangent line intersecting the flow axis at the side wall. Thereby, air/vapor/condensate entering the chamber is forced by the first and second portions to make two angular turns in rapid succession before swirling within the chamber.

The swirl chamber is preferably formed with top and bottom end walls at opposite ends of the cylindrical side wall in which the air and liquid outlets are respectively formed. The flow axis of the second portion, and preferably the flow axis of the first portion as well, lie in a plane which is perpendicular to the central longitudinal axis of the swirl chamber. Thereby, the condensate enters the swirl chamber without a vertical component of velocity in the direction of the longitudinal axis.

A de-vortexing arrangement extending between the swirl chamber and air outlet is preferably provided to disrupt swirling of any condensate flowing upwardly towards the air outlet. The de-vortexing arrangement preferably comprises elongate members extending perpendicular to each other which are secured to inside surfaces of the top end wall to extend across the air outlet. The elongate members act as radially extending swirl disrupting vanes whose radially innermost ends are spaced from each other yet lie directly beneath the air outlet opening.

The aforesaid apparatus for removing solvent vapor from a process air stream preferably comprises two or more of said tanks which are alternately connected to the inlet and outlet ducts in an adsorbing mode. Preferably, one tank is connected to the inlet and outlet ducts in the adsorbing mode while the other tank, previously in the adsorbing mode, is in the regenerating mode. During regeneration, steam is injected into the bottom of the regenerating tank where it flows upwardly through the bed into a steam exhaust manifold communicating with an upper portion of the tank. The manifold conveys the steam, now laden with solvent vapor desorbed from the bed, into the condenser where the steam and solvent vapor condense and flow into the separator. The swirl chamber or degasser is effective to provide a flow path out of the condenser for any solvent vapor or steam (and condensate entrained with it) which does not condense, whereby the condensate is separated from the solvent vapor/air for draining to the separator while the solvent vapor/air is returned to the inlet duct for joining the process air stream flowing to the other tank in the adsorbing mode.

The foregoing connection of the degasser to the solvent laden air inlet duct generates a negative pressure condition within the degasser by the action of the main blower drawing air through the inlet duct through the then absorbing tank so as to assure positive venting of solvent vapor/air in the condenser to the degasser.

After steaming, the steam inlet valve to the regenerating tank is closed, the steam exhaust valve remains open, and a compressed air inlet valve opens to supply compressed air into the tank bottom. The compressed air flows upwardly under pressure through the bed and enters the condenser through the steam exhaust manifold together with residual solvent vapor and steam entrained with it from the tank. During compressed air purging, the compressed air entering the condenser under relatively high pressure tends to create turbulence and water splashing within the condenser. The degasser functions to prevent such turbulence by providing a flow path for the compressed air out of the condenser and a swirl chamber for depressurizing the compressed air flow entering the degasser.

After purging, the steam exhaust valve and compressed air inlet valve are closed, the solvent laden air outlet duct is opened and ambient air is supplied into the tank through a cooling air valve and filter so as to cool the bed to enhance its adsorption capabilities. After cooling, the cooling air valve is closed and the solvent laden air inlet duct reopens to return the tank to the adsorbing mode.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 1 is a front elevational plan view, partly in schematic form, of an apparatus for removing solvent vapor from a process air stream in accordance with the present invention;

FIG. 2 is a side elevational view, partly in schematic form, of the apparatus of FIG. 1;

FIG. 3 is a front elevational view of a degasser device in accordance with the present invention;

FIG. 4 is a top plan view of the degasser of FIG. 3; and

FIG. 5 is a sectional view taken along the line 5—5 of FIG. 3.

BEST MODE FOR CARRYING OUT THE INVENTION

FIGS. 1 and 2 are front and side elevational views, respectively, of an apparatus 10 for recovering solvent vapor from a process air stream. The apparatus 10 comprises at least a pair of tanks 12 and 14 supported by vertical supports 16 and mounting skid 18 on a floor. Each tank 12,14 contains a bed 20 of activated carbon supported on a grate 22 mounted within the tank above the tank bottom. Solvent laden process air (SLA), such as from degreaser equipment and other plant exhaust air streams, is directed into one of tanks 12,14 through a SLA inlet duct 24. The duct 24 is equipped with a heat exchanger 26 and air filter 28 which respectively cools and filters particulate material from the SLA stream before it enters the tank through an inlet opening 29 formed in top wall 30 thereof. Each inlet opening 29 is selectively opened and closed to alternately connect tanks 12,14 to inlet duct 24 with a pneumatically actuated inlet valve 31.

In the adsorption mode, the SLA stream enters one of the adsorbing tanks 12,14 through the inlet opening 29 where the stream is forced to flow downwardly through the carbon bed 20 which is effective to remove, by adsorption, more than 97% of the solvent vapor entering the adsorbing tank. The treated air stream then flows downwardly through grate 22 into the tank bottom where it exits the tank through an outlet 32. The outlet 32 is connected through a pneumatically actuated outlet valve 34 to an outlet duct 36 which directs the treated air stream out of the apparatus 10. A main blower 38 within outlet duct 36, downstream from tank outlet 32, induces the air flow which pulls the SLA stream from the inlet duct 24 through the carbon bed 20. The blower 38 is mounted to communicate with the interior of either tank 12,14 through the then opened outlet valve 34 of the tank in the adsorbing mode.

In the adsorption mode of one of tanks 12,14, the associated SLA inlet and outlet valves 31,34 are opened while the corresponding valves of the other tank are closed. When the carbon in bed 20 becomes loaded to its maximum or a predetermined level in the adsorbing tank, as may be detected with a hydrocarbon analyzer 40 (e.g., a Flame Ionization Detector Monitor), the SLA inlet and outlet valves 31,34 of the adsorbing tank is closed and the corresponding valves of the other tank are opened in the adsorbing mode to switch tanks. The tank 12,14 previously in the adsorbing mode now undergoes regeneration.

In the regeneration mode, steam is supplied into the bottom of the regenerating tank 12 or 14 through a steam inlet pipe 42 and steam inlet valve 44 where it is distributed through the tank bottom with a deflector 46. As the steam flows upwardly under pressure (e.g., 9–10 psig) through carbon bed 20, solvent is desorbed by the steam from the carbon bed. The steam then functions as a carrier gas to transport the solvent vapor through a steam exhaust pipe 48 into a main condenser 50. The steam enters exhaust manifold 48 through a steam outlet 44a which may be opened and closed with a steam exhaust valve 49 positioned in the exhaust manifold slightly downstream from the steam outlet.

In the condenser 50, the steam and entrained solvent vapor are condensed by means of cooling water circulating within the condenser in a separate water cooling jacket or circuit 52. The cooling water enters jacket 52 through cooling water inlet pipe 54 and leaves the jacket through cooling water outlet pipe 54a. The water and solvent condensates collect in the bottom of condenser 50 where they drain through a bottom outlet 56 into a conventional water separator or decanter 58 through piping 60 (FIG. 2). Optionally, a secondary condenser 62 may be disposed within piping 60 to condense any solvent vapor entering the piping with the condensate. In the decanter 58, the water (i.e., condensed steam) and solvent condensate form separate immiscible liquid layers which may be separately drained off through water outlet 58a and solvent outlet 58b in known manner.

The steaming cycle generally continues for a preset time interval (typically 60 minutes). During the steaming cycle, any solvent vapor and steam which does not condense within the condenser 50, as well as any condensate entrained therewith, enters a degasser 65 constructed in accordance with the present invention, through a conduit 67. The conduit 67 has an inlet 67a in the condenser wall which is located above the condenser bottom outlet 56, and an outlet 67b which enters degasser 65 through a vertically extending cylindrical side wall 69 and between top and bottom end walls 70 and 72 thereof.

In accordance with the unique features set forth more fully below, the degasser side wall 69 defines a cylindrical swirl chamber 75 having a cylindrical vertically extending inner surface 75a (FIGS. 3 and 4) against which the vapor/condensate mixture impinges between the top and bottom end walls 70,72. The condensate is spun centrifugally around the cylindrical inner surface 75a under its own momentum where gravity and friction with the cylindrical surface cause the liquid condensate to drop to the bottom end wall 72 which is provided with a liquid outlet 77 through which the liquid drains into the decanter 58 through a pipe 79. Air and solvent vapor separating from the liquid condensate within chamber 75 travels upwards through outlet 80 formed in top end wall 70 where it is directed through piping 82 into the SLA inlet duct 24. In the duct 24, the solvent vapor and air joins the SLA inlet stream for processing in the then adsorbing tank 12 or 14.

Because of the positive closed loop connection between degasser 65 and SLA inlet duct 24 provided by piping 82, it will be appreciated that a negative pressure condition generally prevails within the degasser which is caused by main blower 38 inducing a draft within the inlet duct 24 through whichever tank is in the adsorbing mode. Advantageously, then, positive venting to the SLA inlet duct 24 of any solvent vapors entering condenser 50 which are not condensed is assured by the degasser 65.

After steaming, the steam inlet valve 44 of the tank 12,14 in the regenerating mode closes, the steam exhaust valve 49 remains open and a compressed air valve 83 opens to direct compressed air into the bottom of the tank beneath the bed 20. The compressed air purges the steam and solvent vapor remaining in the tank at the end of the steaming cycle to recover solvent which would otherwise be lost to atmosphere through the SLA outlet valve 34 upon recommencement of the adsorbing mode. The compressed air enters the tank at a pressure of approximately 80 psig to drive the residual steam and solvent vapor from the tank to the condenser 50 through the steam exhaust valve 49 where the steam and solvent vapor condense or otherwise enter the degasser 65 in the manner described above.

The degasser 65 is of particular importance during the compressed air purge since the compressed air enters the condenser 50 under relatively higher pressures than the steam and causes turbulence and splashing within the condenser. Without the swirl chamber of degasser 65, this turbulence and/or splashing may possibly result in entrainment of water or solvent condensate from the condenser into the SLA inlet duct 24 via return conduit 82, wherein corrosion of the inlet duct would occur. In fact, in the prior arrangement discussed above, the vent pipe (i.e., the predecessor of degasser 65 of the present invention and which opened to atmosphere) which extended upwardly from a T-fitting connected to piping between the condenser and water separator, permitted solvent and water condensate to be propelled therethrough in an uncontrolled manner, both during the steaming cycle but particularly under the pressures caused by compressed air entering the condenser in the purging cycle, at high velocity to splash against the underside of the SLA inlet duct and exterior surfaces of the equipment, causing corrosion and equipment damage.

The unique cylindrical construction of degasser 65 advantageously operates to relieve the condenser of excessive pressures, particularly in the purging cycle but also in the steaming cycle, by causing the condensate to spin centrifugally around the inner cylindrical wall 75a of the swirl chamber 75 to dispel the high pressure and separate liquid condensate from the solvent vapor (and/or compressed air) entering the degasser through the conduit 67.

More specifically, with reference to FIGS. 3–5, the conduit 67 includes a first flow path portion 85 that extends radially inwardly from the cylindrical inner surface 75a and a second flow path portion 87 connected to the first portion 85 preferably at right angles to each other. The first and second flow path portions 85,87 define an L-shaped inlet within the swirl chamber 75 which is connected to the conduit 67 extending from the condenser and which includes an outlet opening 90 which is spaced from the cylindrical inner surface 75a. Thereby, entrained liquid entering the swirl chamber 75 through conduit 67 is forced to make two sharp angular turns in rapid succession which greatly attenuates the pressure flow of air, solvent vapor and liquid condensate entering the degasser. The first sharp angular turn is a 90° turn which the vapor and condensate make as they flow from first flow path portion 85 into second flow path portion 87. The second sharp angular turn occurs when the vapor and condensate strike the cylindrical inner surface 75a at an angle which is formed between the central longitudinal axis of second flow path portion 87 and a tangent line intersecting this longitudinal axis along the cylindrical inner surface.

With reference to FIGS. 3 and 5, it is another preferred feature of this invention to orient the first and second flow path portions 85 and 87 and particularly the second portion 87 so that its central longitudinal axis lies in a plane which is perpendicular to the central longitudinal axis of the swirl chamber 75. In this manner, the air, solvent vapor and liquid condensate entering the swirl chamber 75 through the first and second flow path portions 85,87 preferably strike the cylindrical inner surface 75 without a vertical component of velocity along the longitudinal axis of the swirl chamber.

Another preferred feature of degasser 65 in accordance with the present invention is the provision of one or more flat bars 92 and 94 fixed to the inner surface of top end wall 70 to extend directly below and across the air/vapor outlet 80 (leading up to the SLA inlet duct 24 in the manner described above). The flat bars 92 and 94 which preferably intersect each other at their centers and along the central longitudinal axis of the outlet duct 80 define a vortex breaker which prevents a cork screwing effect that might otherwise cause liquid condensate to be entrained upwardly through the air outlet 80 into the SLA inlet duct 24 where corrosion problems might occur.

Due to the negative pressure operating condition of the degasser 65 mentioned above, a static pressure port 95 is preferably formed in the cylindrical wall 75a adjacent top end wall 70 to control static pressure in the degasser, particularly at the start of the steaming and compressed air purge cycles to prevent siphoning of the decanter 58 during normal operation due to the negative pressure operating condition of the degasser. A manual ball valve schematically depicted at 97 in FIG. 4, is preferably piped to this static pressure port or fitting 95, and normally positioned open to prevent such siphoning of the decanter contents. The valve 97 is left open to regulate the negative pressure operating condition upon reaching steady state conditions within either the steaming or purging cycle.

After completion of the compressed air purge described above, the compressed air valve 82 and steam exhaust valve 49 are closed in preparation for switching the tank from the regeneration mode back to the adsorbing mode. However, since hot activated carbon does not adsorb solvent in an efficient manner, it is necessary to cool the carbon bed 20 prior to placing the tank back into the adsorption mode. Accordingly, the SLA outlet valve 34 is opened and ambient air is caused to flow into the tank 12 or 14 and through carbon bed 20 by entering into the top of the tank through a cooling air inlet valve and filter 100. The flow of cooling air through bed 20 is induced by using the available suction from the main blower 38 in the SLA outlet duct. After a predetermined time interval, the flow of cooling air is stopped, the cooling air inlet valve 100 closed and the SLA inlet valve 31 reopened to resume the adsorbing mode.

Other features of apparatus 10 include an inspection cover 105 permitting inspection of inlet duct 24; a man way 107 which is openable to permit manual access into each of the tanks (for maintenance or repair purposes); insulation jacket 109 covering each tank 12,14, dial thermometers 111 for manually observing the temperatures of the cooling water inlet and outlet flows into condenser 50; a pneumatically actuated ball valve 113 and a gate valve 115 for controlling the flow of cooling water into the condenser 50; an air purge regulator 117 and air purge valves 119 for respectively purging compressed air or steam from their respective inlets after completion of the purging and steaming cycles; sample valves 121 to sample the air leaving the tank; waste water drain 123 for removing condensates from within the tank bottom; separator drain valve 123 for draining decanter 58; pressure relief valve 125 connected to each tank 12,14 to prevent overpressurization of the tank particularly during the purging cycle; sight glass 127 and dial thermometer 129 mounted to condenser 50 to monitor conditions within the condenser; and a control and graphic panel and filter condition arrangement 130 constructed in a manner known to one of ordinary skill in the art based upon review of this specification for controlling and monitoring the operation of each tank in the adsorbing and regenerating modes by controlling the various valves in the manner described above.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. Apparatus for removing solvent vapor from a process air stream, comprising:
    (a) at least a first tank provided with a bed of material capable of adsorbing solvent from the process air stream flowing through it in an adsorbing mode;
    (b) inlet duct means for directing the process air into the tank at one side of the bed;
    (c) outlet duct means communicating with the other side of the bed for directing process air flowing through the bed out of the tank;
    (d) means for closing the inlet and outlet duct means to stop the flow of process air into and out of the tank, terminating the adsorbing mode;
    (e) first means for directing a gaseous flow medium into the tank through the bed, said gaseous flow medium having the characteristic of desorbing solvent from the bed in a regenerating mode;
    (f) condenser means connected to said at least first tank to receive said gaseous flow medium and solvent vapor desorbed by the medium for condensing said solvent vapor and/or medium into solvent and water condensates, respectively;
    (g) separator means, connected to the condenser means through a first outlet formed in a bottom region of the condenser means where condensates collect, for receiving and storing said condensates from the condenser means; and
    (h) means, connected to the condenser means through at least one outlet in the condenser means located above the bottom portion, for directing residual solvent vapor and water and condensate entrained therewith out of the condenser means and along a flow path provided with a chamber of greater cross-sectional area than the flow path, in which chamber said solvent vapor and air are separated from the entrained condensates, said chamber including an air outlet in an upper portion thereof through which the air and vapor exit the chamber, and a liquid outlet in a bottom portion thereof through which separated liquid is discharged from the chamber.

2. The apparatus of claim 1, wherein said air outlet is connected to the inlet duct means to return solvent vapor and air to the solvent laden process air stream for further processing by adsorption.

3. Apparatus of claim 2, wherein said liquid outlet is connected to the separator means to direct the separated condensates thereto.

4. Apparatus of claim 3, wherein said chamber means includes a cylindrical side wall defining a cylindrical swirl chamber against which the vapor/air/condensate entering the chamber from the flow path through an inlet are propelled so that the condensate may swirl within the chamber and collect, by gravity, at the bottom of the chamber in separated condition from the air/vapor.

5. Apparatus of claim 4, wherein said inlet into the swirl chamber has a first flow path portion extending radially inwardly from the cylindrical side wall into the chamber and a second flow path portion or outlet end, formed generally perpendicular to the first flow path portion and which second flow path portion has a longitudinal flow axis forming an angle with a tangent line intersecting the flow axis at the side wall, wherein air/vapor/condensate entering the chamber is forced by the first and second flow path portions to make two angular turns in rapid succession before swirling within the chamber.

6. Apparatus of claim 5, wherein said swirl chamber has top and bottom end walls at opposite ends of the cylindrical side wall in which the air and liquid outlets are respectively formed.

7. Apparatus of claim 6, wherein the flow axis of the second flow path portion lies in a plane which is perpendicular to the central longitudinal axis of the swirl chamber.

8. Apparatus of claim 7, wherein the flow axes of both said first and second flow path portions lie in a common plane which is perpendicular to the central longitudinal axis of the swirl chamber.

9. Apparatus of claim 8, wherein said plane bisects the swirl chamber.

10. Apparatus of claim 4, further comprising devortexing means extending between the swirl chamber and air outlet for preventing condensate swirling in the chamber from traveling into the air outlet.

11. Apparatus of claim 10, wherein said devortexing means includes elongate members extending generally perpendicular to each other and secured to inside surfaces of a top end wall to extend across the air outlet.

12. Apparatus of claim 4, further including first and second of said tanks alternately connected to the inlet and outlet duct means and the first means to that one of said first and second tanks is connected to the inlet and outlet duct means in the adsorbing mode while the other of said first and second tanks is connected to the first means in the regenerating mode.

13. Apparatus of claim 12, wherein said first means includes means for supplying steam into the tank in the regenerating mode and a steam exhaust manifold for directing the steam to the condenser means after it flows through the bed.

14. Apparatus of claim 13, wherein said first means further includes compressed air purge means for supplying compressed air into the tank, after steaming, to drive residual steam and solvent vapor in the tank into the condenser means.

15. Apparatus of claim 14, wherein said first means further includes cooling means for supplying a cooling flow of air into the tank, after the compressed air purge, for cooling the bed to enhance its solvent adsorbing characteristics.

* * * * *